United States Patent
Mangal et al.

(10) Patent No.: US 9,870,001 B1
(45) Date of Patent: Jan. 16, 2018

(54) AUTOMATED VEHICLE OPERATOR SKILL EVALUATION SYSTEM

(71) Applicant: DELPHI TECHNOLOGIES, INC., Troy, MI (US)

(72) Inventors: Nandita Mangal, Palo Alto, CA (US); Michael H. Laur, Mission Viejo, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/229,997

(22) Filed: Aug. 5, 2016

(51) Int. Cl.
*G01C 22/00* (2006.01)
*G05D 1/00* (2006.01)
*B60W 50/08* (2012.01)

(52) U.S. Cl.
CPC .......... *G05D 1/0061* (2013.01); *B60W 50/08* (2013.01); *G05D 1/0088* (2013.01); *B60W 2550/12* (2013.01); *B60W 2550/141* (2013.01); *B60W 2550/20* (2013.01); *B60W 2600/00* (2013.01)

(58) Field of Classification Search
CPC ... G05D 1/0061; G05D 1/0088; B60W 50/08; B60W 2550/20; B60W 2550/141; B60W 2550/12; B60W 2550/00
See application file for complete search history.

(56) References Cited

U.S. PATENT DOCUMENTS

| | | | |
|---|---|---|---|
| 2006/0259206 A1 | 11/2006 | Smith et al. | |
| 2008/0122603 A1 | 5/2008 | Plante et al. | |
| 2011/0241862 A1* | 10/2011 | Debouk | B60W 50/035 340/439 |
| 2013/0002416 A1* | 1/2013 | Gazit | B62D 1/28 340/438 |
| 2016/0185387 A1* | 6/2016 | Kuoch | B60K 35/00 701/41 |
| 2016/0280235 A1* | 9/2016 | Sugaiwa | B60W 50/10 |
| 2016/0280236 A1* | 9/2016 | Otsuka | B60W 50/082 |
| 2017/0102700 A1* | 4/2017 | Kozak | B60W 30/00 |
| 2017/0106876 A1* | 4/2017 | Gordon | B60W 50/082 |
| 2017/0106903 A1* | 4/2017 | Moretti | B62D 6/00 |
| 2017/0269586 A1* | 9/2017 | D'Andrea | G05D 1/0016 |

* cited by examiner

*Primary Examiner* — Hussein Elchanti
(74) *Attorney, Agent, or Firm* — Lawrence D. Hazelton

(57) ABSTRACT

An operator-evaluation system for an automated vehicle includes a traffic-detector and a controller. The traffic-detector is used to determine a complexity-ranking of a traffic-scenario approached by a host-vehicle. The controller is in communication with the traffic-detector and is configured to operate the host-vehicle in: an automated-mode where the controller steers the host-vehicle toward a desired-position of a travel-lane; a monitored-mode where an operator steers the host-vehicle and the controller assists the operator to steer the host-vehicle toward the desired-position when the host-vehicle is farther than a lateral-threshold from the desired-position; and a manual-mode where the operator steers the host-vehicle without assistance from the controller. The controller transitions from the automated-mode to the monitored-mode prior to arrival at the traffic-scenario to determine a skill-ranking of the operator relative to the complexity-ranking, and transitions from the automated-mode to the manual-mode when the complexity-ranking is less than the skill-ranking of the operator.

7 Claims, 2 Drawing Sheets

AUTOMATED VEHICLE OPERATOR SKILL EVALUATION SYSTEM

TECHNICAL FIELD OF INVENTION

This disclosure generally relates to an operator-evaluation system for an automated vehicle, and more particularly relates to a system that determines a skill-ranking of an operator and compares the skill-ranking to a complexity-ranking of an upcoming traffic-scenario to determine if the operator is capable of operating the vehicle in a manual-mode.

BACKGROUND OF INVENTION

It is expected that in certain situations or traffic-scenarios it will be necessary for an automated-vehicle to relinquish control of the vehicle to a human-operator such as an occupant or a remote-operator of the automated-vehicle. For example, it may be that map-data is relatively sparse for an upcoming section of a selected travel-route, so it may be seem to be safer to have the human-operator take control of the vehicle. However, if the occupant is for some reason unable to assume control, e.g. the operator is ill, incapacitated, intoxicated, or the remote control link is severed, alternative actions by the controller within the automated vehicle may be necessary.

SUMMARY OF THE INVENTION

In accordance with one embodiment, an operator-evaluation system for an automated vehicle is provided. The system includes a traffic-detector and a controller. The traffic-detector is used to determine a complexity-ranking of a traffic-scenario approached by a host-vehicle. The controller is in communication with the traffic-detector. The controller is configured to operate the host-vehicle in: an automated-mode wherein the controller steers the host-vehicle toward a desired-position of a travel-lane; a monitored-mode wherein an operator steers the host-vehicle and the controller assists the operator to steer the host-vehicle toward the desired-position when the host-vehicle is farther than a lateral-threshold from the desired-position; and a manual-mode wherein the operator steers the host-vehicle without assistance from the controller when the controller is unable to navigate the traffic-scenario. The controller transitions from the automated-mode to the monitored-mode prior to arrival at the traffic-scenario to determine a skill-ranking of the operator relative to the complexity-ranking, and transitions from the automated-mode to the manual-mode when the complexity-ranking is not greater than the skill-ranking of the operator.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
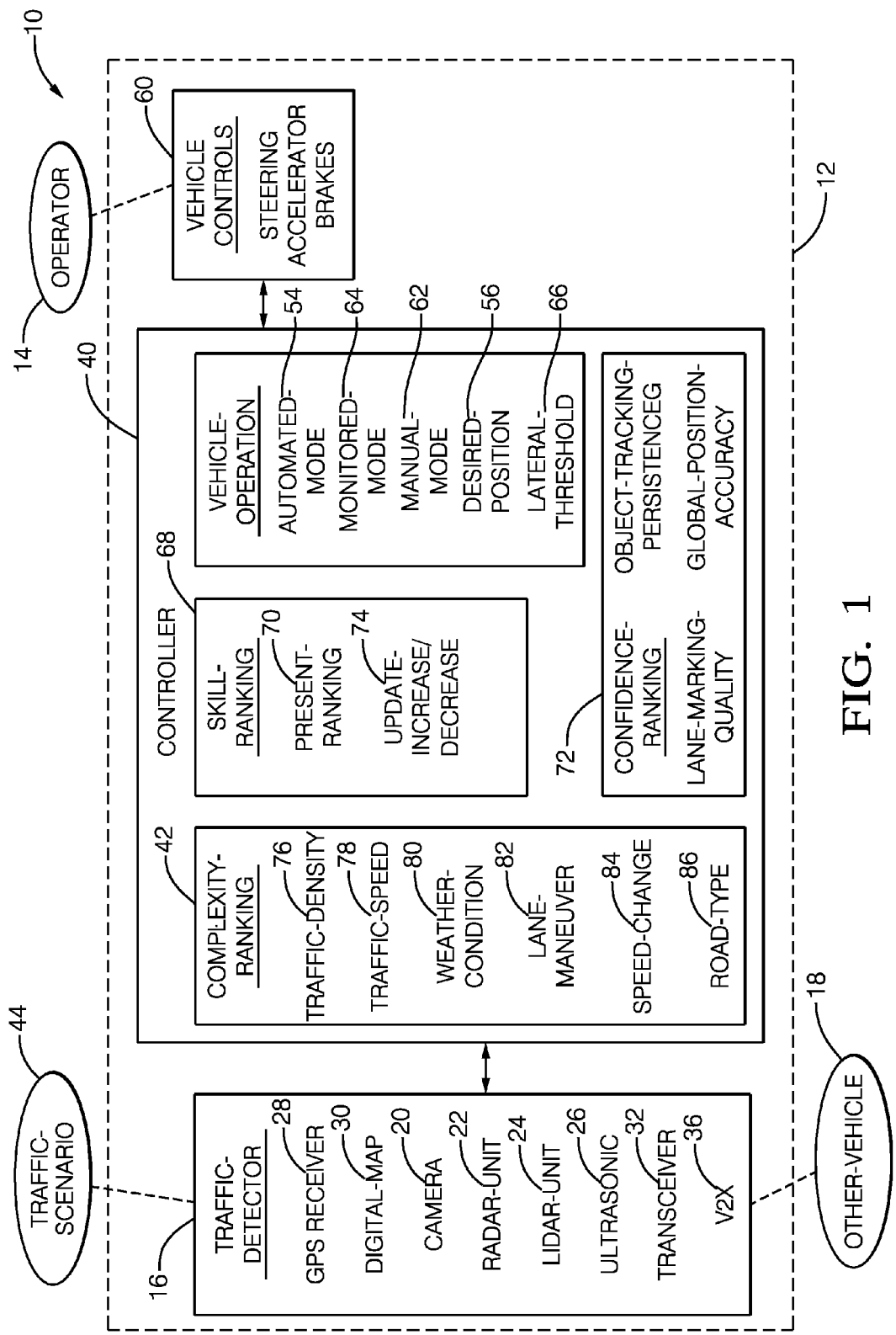
FIG. 1 is a diagram of an operator-evaluation system in accordance with one embodiment.

FIG. 1 illustrates a non-limiting example of an operator-evaluation system, hereafter referred to as the system 10, which is generally intended for use by an automated vehicle, for example the host-vehicle 12. As will be explained in more detail below, the system 10 described herein is an improvement over prior systems capable of both fully automated and manual (human driven) operation because the system 10 tests or evaluates the ability of an operator 14 to take manual control of the host-vehicle 12 prior to the system 10 actually relinquishing automated control of the host-vehicle 12. For example, when the system 10 deems an upcoming situation or traffic-scenario to be too complicated or otherwise unsuitable for fully automated or autonomous control of the host-vehicle 12, the system 10 seeks to identify some way to test the ability of the operator 14 to safely operate the host-vehicle 12 prior to actually relinquishing control. For example, if the operator 14 is a passenger in the host-vehicle 12, it may be that the operator 14 is ill, injured, intoxicated, or otherwise incapacitated at least with regard to operating a motor vehicle. It is also contemplated that the teachings presented herein are applicable to an automated vehicle that generally operates autonomously, but is controlled by a remote-operator (rather than a passenger if the host-vehicle is used to transport passengers) if necessary. For example, the communications link between the host-vehicle 12 and the remote-operator may not be operating due to an equipment failure, or because the communications link is being maliciously jammed or otherwise interfered with, i.e. hacked.

The system 10 includes a traffic-detector 16 used to detect one or more instances of an other-vehicle 18 proximate to the host-vehicle 12, and/or features of a roadway 34 traveled by the host-vehicle 12. The traffic-detector may include any one or more of a camera 20, a radar-unit 22, a lidar-unit 24, an ultrasonic transducer 26, or any combination thereof. The traffic-detector 16 may also include a global-position-system-receiver, hereafter the GPS receiver 28, which is used to determine a location of the host-vehicle 12 on a digital-map 30. The traffic-detector 16 may also include a transceiver 32 that is used for, but not limited to, vehicle-to-infrastructure (V2I) communications, vehicle-to-vehicle (V2V) communications, and/or vehicle-to-pedestrian (V2P) communications, which may be generically labeled as V2X communications 36. V2X communications may be used to determine the location on the digital-map 30 and detect the other-vehicle 18, as will be recognized by those in the art.

The system 10 includes a controller 40 in communication with the traffic-detector 16. The controller 40 may include a processor (not specifically shown) such as a microprocessor or other control circuitry such as analog and/or digital control circuitry including an application specific integrated circuit (ASIC) for processing data as should be evident to those in the art. The controller 40 may include memory (not specifically shown), including non-volatile memory, such as electrically erasable programmable read-only memory (EEPROM) for storing one or more routines, thresholds, and captured data. The one or more routines may be executed by the processor to perform steps for operating the host-vehicle 12 based on signals received by the controller 40 from the traffic-detector 16 as described herein.

The traffic-detector 16 is used by the controller 40 to determine a complexity-ranking 42 of a traffic-scenario 44 approached by the host-vehicle 12. As used herein, the traffic-scenario 44 is used to identify an upcoming section or area of the roadway 34 that may require more action by the controller 40 and/or the operator 14 than is necessary when the host-vehicle 12 is traveling a straight road without any complications such as possible interference by other vehicles or obstacles, or a traffic-signal/stop-sign. By way of example and not limitation, examples of the traffic-scenario 44 include an exit 46 (FIG. 2) from the roadway 34 onto a side-road 48, an intersection 50, a traffic-circle (not shown), or a stopped-vehicle (not shown) on the roadway 34. The complexity-ranking 42 may be, for example, a numerical value ranging from one (1) to five (5), which is used to quantify how complicated will be the navigation of the traffic-scenario 44. For example, if the roadway 34 is relatively straight, the lane-markings 52 of the roadway 34 are easily detected by the traffic-detector 16, and the roadway 34 is clear of debris and dry, a suitable value for the complexity-ranking 42 is one (1). However, if there is a multi-vehicle accident (not shown) detected ahead of the host-vehicle 12, and emergency-vehicles are present on-site, and a police-officer directing traffic around the site of the accident, a suitable value for the complexity-ranking 42 is five (5). It is contemplated that the V2X communications 36 may inform the controller 40 of such an accident before it can be detected by, for example, the camera 20.

Examples of other factors that can increase the value of the complexity-ranking 42 of the traffic-scenario 44 include instances where the roadway 34 or side-road 48 are characterized as having inadequate map-data, i.e. information on the digital-map 30 at the location of the traffic-scenario 44 is relatively sparse or out-of-date. Other examples are instance of freeway transitions where the quality/consistency of the lane-markings 52 may suddenly change, small radius exit loops that require precise steering and speed control of the host-vehicle 12, traffic-circles where predicting the travel-path of the other-vehicle 18 may be difficult, a stopped-vehicle ahead of the host-vehicle 12 where the future actions of the stopped-vehicle are unknown, traffic flow patterns that require a merge or lane-change, speed limit changes, etc.

The controller 40 is configured to operate the host-vehicle 12 in an automated-mode 54 where the controller 40, for example, steers the host-vehicle 12 toward a desired-position 56 of a travel-lane 58 using the vehicle-controls 60. The desired-position 56 may be, but is not required to be, the center of the travel-lane 58. It is contemplated that the automated-mode 54 also controls the speed of the host-vehicle 12 by operating the accelerator and brakes in addition to operating the steering. While operating in the automated-mode 54 a passenger of the host-vehicle 12, e.g. the operator 14 if the operator is on-board the host-vehicle 12, does little more than possibly designate a destination. That is, while in the automated-mode the operator 14 will typically not operate or influence the vehicle-controls 60 unless the operator 14 detects a danger and, for example, physically overrides the operation of the steering and/or brakes.

The controller 40 is also configured to operate the host-vehicle 12 in a manual-mode 62 where the operator 14 at least steers the host-vehicle 12. While operating in the manual-mode 62, operation of the host-vehicle is generally the sole responsibility of the operator, so is generally done without assistance from the controller 40. However, it is contemplated that the operator 14 may activate a speed-control system (i.e. cruise-control) while remaining in the manual-mode 62. It is also contemplated that some safety systems would still be active such as automatic-braking that engages to prevent a collision, or dynamic vehicle control that assists the operator 14 to recover from a skid. A general characteristic of the safety systems that would still be active while operating in the manual-mode 62 is that the operator 14 would not detect that those safety-systems were active unless the safety-system acted in some way to assist the operator 14 in an emergency situation.

It is envisioned that safety systems like a lane-keeping-system would be deactivated to prevent undue interference with control of the host-vehicle 12 by the operator 14. In particular, the operator 14 would be able to drive on a shoulder (not shown) of the roadway 34 without interference by the lane-keeping-system. The general purpose of the manual-mode 62 is to provide the option to the operator 14 to drive the host-vehicle 12 because the operator 14 may enjoy driving, and/or provide for a means to operate the host-vehicle when the controller 40 is unable to navigate or operate the host-vehicle 12 though the traffic-scenario 44. For example, if it is necessary to momentarily steer the host-vehicle 12 off of the roadway 34 to navigate around the aforementioned multi-vehicle accident, it may be prudent to have the operator 14 control the host-vehicle 12 rather than rely on the controller 40 to control the host-vehicle in such a rather complex and unpredictable example of the traffic-scenario 44.

The controller 40 is also configured to operate the host-vehicle 12 in a monitored-mode 64 where, for example, the operator 14 steers the host-vehicle 12 and the controller 40 assists the operator 14 to steer the host-vehicle 12 toward the desired-position 56 when the host-vehicle 12 is farther than a lateral-threshold 66 from the desired-position 56. That is, while operating in the monitored-mode 64, the operation of the host-vehicle 12 would seem to the operator 14 to be the same as or equivalent to the manual-mode 62, unless the operator allowed the host-vehicle 12 to deviate too far from the desired-position 56, more than one-point-five meters (1.5 m) for example. By way of another non-limiting example, if while operating in the monitored-mode 64 the operator 14 becomes too close to another vehicle (not shown) forward of the host-vehicle 12, i.e. the operator 14 is tail-gating another vehicle, the controller 40 may momentarily override the operation of the accelerator and/or the brakes to establish a safer following distance for the host-vehicle 12.

It has been determined by researchers and engineers working to develop automated vehicles that there is often substantial uncertainty when a transition from the automated-mode 54 to the manual-mode 62 is executed because the mental and physical state of the operator 14 is uncertain. For example, while operating in the automated-mode the operator 14 may have fallen asleep or become ill, or the operator 14 may have initiated the automated-mode 54 because the operator 14 was ill and needed to be taken to a hospital. Various schemes have been suggested to provide advanced warnings to the operator 14 and/or execute an early transition from the automated-mode to the manual-mode while the complexity-ranking 42 is low at a location well in advance of the complexity-ranking of the traffic-scenario 44 is too great for the automated-mode 54. However, the schemes do not address the fundamental problem of not knowing the state, capability, or capacity of the operator 14 to assume control of the host-vehicle, hereafter referred to as the skill-ranking 68 of the operator 14.

In order to determine the skill-ranking 68, the controller 40 transitions from the automated-mode 54 to the monitored-mode 64 prior to arrival at the traffic-scenario 44 that requires the manual-mode 62. This transition may be initiated by a visual and/or audible indication detectable by the operator 14 that the manual-mode 62 (unbeknownst to the operator 14 that it is actually the monitored-mode 64) is being engaged. Alternatively, the indication may inform the operator 14 the monitored-mode 64 is being engaged to verify that the operator 14 is able to take control. The skill-ranking 68 of the operator 14 is determined relative to the complexity-ranking 42 by measuring how well the operator 14 negotiates a prior instance of the traffic-scenario 44 selected to determine the skill-ranking 68 prior to arriving at a subsequent instance of the traffic-scenario 44 that requires the operator 14 to be in control of the host-vehicle 12. As suggested above, safety systems such as lane-keeping and automated-braking may still be activated while in the monitored-mode 64, but the thresholds for engagement of these systems may be changed to allow for more error on the part of the operator 14 while being monitored to determine the skill-ranking 68.

Once the skill-ranking 68 is determined, i.e. a most recent or a present-ranking 70 of the operator 14 is recorded, the controller 40 may confidently transition from the automated-mode 54 to the manual-mode 62 if/when the complexity-ranking 42 of the upcoming instance of the traffic-scenario is not greater than the most recent value of the skill-ranking 68 (i.e. the present-ranking 70) of the operator 14. It is preferable that the skill-ranking 68 be determine as close to the traffic-scenario 44 that requires the manual-mode 62 so the operator 14 does not fall asleep during the interim.

Figure 2:
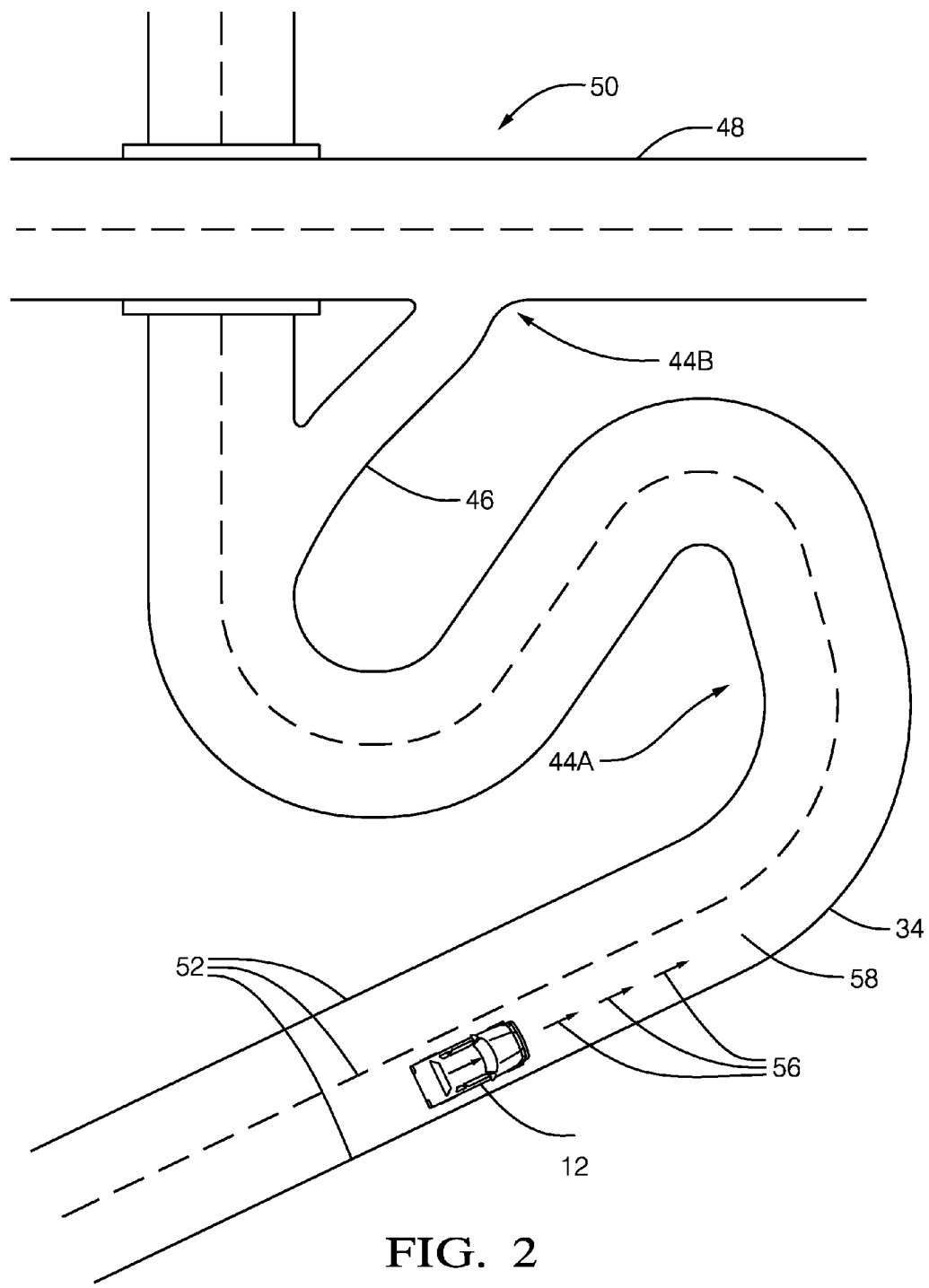
FIG. 2 is an illustration of a roadway encountered by the system of FIG. 1 in accordance with one embodiment.

FIG. 2 illustrate a non-limiting example of the roadway 34 traveled by the host-vehicle 12 where a second-scenario 44B requires the manual-mode 62 because the digital-map 30 (FIG. 1) does not contain sufficient information for the automated-mode 54 to be used to operate the host-vehicle 12 on the side-road 48. The roadway 34 includes some curves identified as a first-scenario 44A that may be used to determine the skill-ranking 68 of the operator 14. By way of further example, because the digital-map 30 does not contain sufficient information for the automated-mode 54 to be used to navigate the second-scenario 44B, but there are no indications of accidents or other impediments to travel on the side-road 48, the complexity-ranking 42 may be set at four (4). By comparison, the multi-vehicle accident described above that may require the host-vehicle 12 to travel off the roadway 34 to circumnavigate may have the complexity-ranking 42 set at five (5). By further comparison, the first-scenario 44A includes some curves so the first-scenario 44A would be assigned a greater value for the complexity-ranking 42, two (2) for example. The complexity-ranking 42 of traffic-scenarios may be stored in the digital-map 30, or may be calculated by the controller 40 drawing upon information from the digital-map 30 and/or the various sensors that form the traffic-detector 16.

In anticipation of arriving at the second-scenario 44B, the controller 40 engages the monitored-mode 64 prior to arriving at the first-scenario 44A. If the operator 14 navigates the first-scenario 44A well, so the is no indication that the operator 14 is nothing less than fully capable of operating the host-vehicle 12 in the manual-mode 62, then the skill-ranking 68 is set to five (5), the highest value for the skill-ranking 68 in this example because the range of values corresponds to the range of values used for the complexity-ranking 42. However, if the operator 14 allows the host-vehicle 12 deviate or drift too far from the desired-position 56, e.g. the center of the travel-lane 58, the skill-ranking is lowered based on how far from the desired-position 56 the operator allows the host-vehicle 12 to drift.

For example, if the drift is more than one meter (1 m), but the tires of the host-vehicle 12 do not touch the lane-markings 52, the skill-ranking 68 may be set to four (4). Similarly, if the tires cross the lane-markings 52, but do not go off the roadway 34 onto a shoulder for example, then the skill-ranking 68 may be set to three (3). Excessive amounts of steering correction (i.e. weaving) and or speed variation may also cause the skill-ranking 68 to be lowered. It is noted that even though the first-scenario 44A in this example has a value for the complexity-ranking less than five (5), the skill-ranking 68 can be set to a value equal to five (5) by measuring the driving behavior of the operator 14. It is again noted that during the monitored-mode 64 the controller 40 may intervene with operation of the host-vehicle 12 if the operator 14 is unable to adequately control the host-vehicle 12. That is, the system 10, or more specifically the controller 40 may transaction back to the automated-mode 54 and take control of the host-vehicle 12 from the operator 14.

In the event that the complexity-ranking 42 of the second-scenario 44B is greater than the skill-ranking 68 of the operator 14, and the complexity-ranking 42 of the traffic-scenario 44 (e.g. the second-scenario 44B) is greater than some value of a confidence-ranking 72 (e.g. 3, the determination of which will be describe in more detail later), which would prevent operating in the automated-mode 54, the controller 40 may bypass the traffic-scenario 44 (e.g. drive past the exit 46 to bypass the second-scenario 44B) and seek an alternative route to the destination that does not include a traffic-scenario with a complexity-ranking greater than the confidence-ranking 72. That is, the controller 40 operates the host-vehicle 12 in the automated-mode 54 to bypass the traffic-scenario 44 (e.g. stays on the expressway or main road instead of taking the exit 46) when the complexity-ranking 42 of the traffic-scenario 44 is greater than the skill-ranking 68 of the operator 14. While the examples presented so far suggest that the complexity-ranking 42 and the skill-ranking 68 are integer values, it is contemplated that fractional values will be useful, e.g. three-point three (3.3).

An interpretation of the description above may suggest to some that the skill-ranking 68 is not saved for future use. However, this is not the case as it is further contemplated that the controller 40 may be configured to operate the host-vehicle 12 in the monitored-mode 64 to update the skill-ranking 68 when a present-ranking 70 of the operator 14 is less than the complexity-ranking 42 of the traffic-scenario 44 approached by the host-vehicle 12. That is, it is contemplated that the skill-ranking 68 was previous determined to be rather low because, for example, the operator 14 was momentarily distracted or there was some good reason for the operator 14 to swerve that went undetected by the system 10. Accordingly, the controller 40 may periodically and repeatedly engage the monitored-mode 64 to confirm that the skill-ranking 68 was properly set if the present-ranking 70 from a prior instance of operating in the monitored-mode caused the skill-ranking 68 to be low. By way of further example of how the present-ranking 70 may be updated 74, the controller 40 may increase the skill-ranking 68, which is subsequently stored as the present-ranking 70, when operator 14 steers the host-vehicle 12 to less than the lateral-threshold 66 from the desired-position 56, and decrease the skill-ranking 68 when operator 14 steers the host-vehicle to not less than the lateral-threshold 66 from the desired-position 56.

It is contemplated that there are other ways to measure or determine the skill-ranking 68 of the operator 14. For example, the controller 40 may use information from the radar-unit 22 or other suitable ranging device to determine the following distance of the host-vehicle 12 behind a forward-vehicle (not shown) traveling in front of the host-vehicle 12. If the operator 14 follows the forward-vehicle too closely, i.e. tail-gates the forward-vehicle, the skill-ranking 68 may be reduced. Similarly, if the operator 14 does not keep-up with the forward-vehicle, this may cause an undesirable inefficiency for traffic as a whole because the operator 14 is traveling too slowly, so for this the skill-ranking 68 may also be reduced. This assumes that the forward-vehicle is traveling at a safe speed. If the operator 14 follows the forward-vehicle at an appropriate distance, the skill-ranking 68 may be increased. While operating in the monitored-mode 64 the system 10 may issue an audible and/or visible warning to the operator 12 if tail-gating is detected, and may apply the brakes if the host-vehicle 12 is close to contacting the forward-vehicle.

As another example of other ways to measure or determine the skill-ranking 68 of the operator 14, excessive/unnecessary variation in speed may cause an undesirable inefficiency for traffic as a whole, so the skill-ranking 68 may be reduced. Steady speed control helps to save fuel in the host-vehicle 12 and in following-vehicles (not shown) following the host-vehicle 12. Indeed, it is contemplated that if the operator 14 is able to travel at a steady speed by allowing for speed variations by the forward-vehicle, the skill-ranking 68 may be increased.

By way of further example and not limitation, the complexity-ranking 42 may be further determined based on a traffic-density 76 indicative of how many other vehicles are proximate to, e.g. within one-hundred meters (100 m) of, the host-vehicle 12, where the complexity-ranking is increased if the traffic-density 76 is greater that a density-threshold, fifteen (15) instances of other vehicles within 100 m. The complexity-ranking 42 may be further determined based on a traffic-speed 78, e.g. an average speed of the other vehicles proximate to the host-vehicle 12, where higher speeds and other-vehicles exceeding the speed-limit will increase the complexity-ranking 42. The complexity-ranking 42 may be further determined based on a weather-condition 80 where a dry road-surface may have no effect on the complexity-ranking 42, a wet road-surface may increase the complexity ranking by a small amount (e.g. less than 1) and an ice covered road-surface my increase the complexity-rank by a larger amount (e.g. greater than 1). The complexity-ranking 42 may be further determined based on a lane-maneuver 82 where the value may be increased if the traffic-scenario 44 includes a lane-change or lane-shift, and the value may be unchanged if no lane-change is expected. The complexity-ranking 42 may be further determined based on a speed-change 84 where acceleration/deceleration may increase the complexity-ranking 42, and constant-speed through the traffic-scenario 44 may not change the complexity-ranking 42. The complexity-ranking 42 may be further determined based on a road-type 86 where a curved, crowned, and/or banked road may increase the complexity-ranking 42, and a straight and or flat road may not change the complexity-ranking 42.

As suggested above, the controller 40 allows operation of the host-vehicle 12 to transition from the manual-mode 62 to the automated-mode 54 when the complexity-ranking 72 of the traffic-scenario 44 is not greater than the confidence-ranking 72 of the controller 40. The confidence-ranking 72 may be determined based on, but not limited to, one or more of: a lane-marking-quality 88 indicative of how readily and consistently the lane-markings 52 are detected by, for example, the camera 20; an object-tracking-persistence 90 indicative of how time and/or repeatedly detected in is an object, e.g. the other-vehicle 18; and a global-position-accuracy 92 indicative of how well does the GPS coordinates determined using the GPS receiver 28 correspond to a relative position of the lane-markings 52.

Accordingly, an operator-evaluation system (the system 10), a controller 40 for the system 10, and a method of operating the system 10 is provided. The system 10 overcomes some of the uncertainty arising from a transition from the automated-mode 54 to the manual-mode 62 because the skill-ranking of the operator 14 is determined prior to the transition. The skill-ranking 68 is determined during the monitored-mode 64 where the operator 14 is given limited control, and the controller 40 is ready to take back control if the operator 14 is not capable. The monitored-mode 64 is initiated prior to arriving at a traffic-scenario 44 where a complexity-ranking 42 of the traffic-scenario 44 indicates that the traffic-scenario 44 is too complicated for the automated-mode 54.

While this invention has been described in terms of the preferred embodiments thereof, it is not intended to be so limited, but rather only to the extent set forth in the claims that follow.

We claim:

1. An operator-evaluation system for an automated vehicle, said system comprising:
   a traffic-detector used to determine a complexity-ranking of a traffic-scenario approached by a host-vehicle;
   a controller in communication with the traffic-detector and configured to operate the host-vehicle in
   an automated-mode wherein the controller steers the host-vehicle toward a desired-position of a travel-lane,
   a monitored-mode wherein an operator steers the host-vehicle and the controller assists the operator to steer the host-vehicle toward the desired-position when the host-vehicle is farther than a lateral-threshold from the desired-position, and
   a manual-mode wherein the operator steers the host-vehicle without assistance from the controller when the controller is unable to navigate the traffic-scenario, wherein
   said controller transitions from the automated-mode to the monitored-mode prior to arrival at the traffic-scenario to determine a skill-ranking of the operator relative to the complexity-ranking, and transitions from the automated-mode to the manual-mode when the complexity-ranking is not greater than the skill-ranking of the operator.

2. The system in accordance with claim 1, wherein the controller operates the host-vehicle in the automated-mode to bypass the traffic-scenario when the complexity-ranking is greater than the skill-ranking of the operator.

3. The system in accordance with claim 1, wherein the controller operates the host-vehicle in the monitored-mode to update the skill-ranking when a present-ranking of the operator is less than the complexity-ranking of the traffic-scenario approached by the host-vehicle.

4. The system in accordance with claim 1, wherein the controller increases the skill-ranking when operator steers the host-vehicle to less than the lateral-threshold from the desired-position, and decreases the skill-ranking when operator steers the host-vehicle to not less than the lateral-threshold from the desired-position.

5. The system in accordance with claim 1, wherein the complexity-ranking is determined based on one of a traffic-density, a traffic-speed, a weather-condition, a lane-maneuver, a speed-change, and a road-type.

6. The system in accordance with claim 1, wherein the controller allows operation of the host-vehicle to transition from the manual-mode to the automated-mode when the complexity-ranking of the traffic-scenario is not greater than a confidence-ranking of the controller.

7. The system in accordance with claim 6, wherein the confidence-ranking is determined based on one of a lane-marking-quality, an object-tracking-persistence, and a global-position-accuracy.

\* \* \* \* \*